United States Patent
Bolt et al.

(10) Patent No.: US 7,371,275 B2
(45) Date of Patent: May 13, 2008

(54) TITANIUM DIOXIDE PIGMENT AND POLYMER COMPOSITIONS

(75) Inventors: John Davis Bolt, Mcewen, TN (US); Robert William Johnson, Kennett Square, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 9 days.

(21) Appl. No.: 10/884,776

(22) Filed: Jul. 2, 2004

(65) Prior Publication Data

US 2006/0000390 A1    Jan. 5, 2006

(51) Int. Cl.
*C08C 1/00* (2006.01)
*B60C 1/00* (2006.01)
*C08K 3/10* (2006.01)
*C04B 26/06* (2006.01)
*C09C 1/36* (2006.01)

(52) U.S. Cl. ............... 106/430; 106/442; 106/446; 524/435; 524/437; 524/493; 524/497; 524/700; 524/847

(58) Field of Classification Search .......... 524/435, 524/437, 493, 497, 700, 847; 106/430, 442, 106/446
See application file for complete search history.

(56) References Cited

U.S. PATENT DOCUMENTS

| | | | |
|---|---|---|---|
| 2,448,440 A | 8/1948 | King | |
| 2,488,439 A | 11/1949 | Heinrich | |
| 2,559,638 A | 7/1951 | Ignace et al. | |
| 2,885,366 A | 5/1959 | Iler | |
| 3,087,827 A | 4/1963 | Klenke et al. | |
| 3,087,828 A | 4/1963 | Linton | |
| 3,087,829 A | 4/1963 | Linton | |
| 3,208,866 A | 9/1965 | Lewis et al. | |
| 3,396,143 A | 8/1968 | Newland et al. | |
| 3,437,502 A | 4/1969 | Werner et al. | |
| 3,549,091 A | 12/1970 | Slepetys | |
| RE27,818 E | 11/1973 | Werner et al. | |
| 3,825,438 A * | 7/1974 | Pritchard et al. | 427/218 |
| 3,927,119 A * | 12/1975 | Luethi | 568/643 |
| 3,970,627 A * | 7/1976 | Seymus | 523/205 |
| 4,052,222 A | 10/1977 | Howard | |
| 4,209,430 A * | 6/1980 | Weber | 524/497 |
| 4,639,477 A * | 1/1987 | Cseh et al. | 524/83 |
| 4,752,460 A * | 6/1988 | Herren | 423/594.7 |
| 4,770,905 A | 9/1988 | Burchill et al. | |
| 4,792,465 A | 12/1988 | Burchill et al. | |
| 4,865,880 A | 9/1989 | Burchill et al. | |
| 4,913,082 A | 4/1990 | Burchill et al. | |
| 4,925,739 A | 5/1990 | Burchill et al. | |
| 4,927,464 A | 5/1990 | Cowie | |
| 4,937,064 A | 6/1990 | Gonzalez | |
| 4,978,576 A | 12/1990 | Burchill et al. | |
| 5,091,213 A | 2/1992 | Burchill et al. | |
| 5,110,626 A | 5/1992 | Burchill et al. | |
| 5,110,634 A | 5/1992 | Burchill et al. | |
| 5,185,191 A * | 2/1993 | Silbermann et al. | 428/409 |
| 5,190,583 A | 3/1993 | Menzel et al. | |
| 5,201,949 A | 4/1993 | Allen et al. | |
| 5,352,725 A | 10/1994 | Palmer et al. | |
| 5,504,134 A | 4/1996 | Palmer et al. | |
| 5,508,015 A | 4/1996 | Gonzalez et al. | |
| 5,538,708 A | 7/1996 | Gonzalez et al. | |
| 5,562,764 A | 10/1996 | Gonzalez | |
| 5,571,855 A | 11/1996 | Kauffman et al. | |
| 5,650,002 A | 7/1997 | Bolt | |
| 5,840,111 A | 11/1998 | Wiederhoft et al. | |
| 5,886,069 A * | 3/1999 | Bolt | 523/223 |
| 5,902,569 A | 5/1999 | Oshima et al. | |
| 6,285,755 B1 | 9/2001 | Watanabe | |
| 7,029,648 B2 | 4/2006 | Subramanian et al. | |
| 2001/0021439 A1* | 9/2001 | Sumita et al. | 428/195 |
| 2003/0051635 A1 | 3/2003 | Subramanian et al. | |
| 2003/0068345 A1 | 4/2003 | Nishihama | |
| 2003/0082122 A1 | 5/2003 | Chopin et al. | |
| 2003/0089278 A1 | 5/2003 | Bettler et al. | |
| 2003/0101908 A1 | 6/2003 | Hayashi et al. | |
| 2005/0013599 A1 | 1/2005 | Nakanishi et al. | |
| 2005/0023992 A1 | 2/2005 | Lee et al. | |

FOREIGN PATENT DOCUMENTS

| | | |
|---|---|---|
| CN | 2000-112645 | 1/2000 |
| DE | 10205920 | 8/2003 |
| EP | 393857 | 10/1990 |
| EP | 1577266 | 9/2005 |
| ES | 2199078 | 2/2004 |
| JP | 5015 8630 | 12/1975 |
| JP | 66010426 | 1/1980 |
| JP | 50158630 | 8/1985 |
| JP | 04081470 | 3/1992 |
| JP | 05286721 | 11/1993 |
| JP | 06115942 | 4/1994 |
| JP | 07316457 | 12/1995 |
| JP | 1996 056190 | 2/1996 |
| JP | 06283679 | 10/1996 |
| JP | 10081517 | 3/1998 |

(Continued)

OTHER PUBLICATIONS

Leonard C. Komar et. al., Titanium Dioxide in Polymers, Soc. Plast. Eng., Tech. Pap., 26th, 1968, pp. 303-307.

U. Gesenhues, Influence of Titanium Dioxide Pigments on the Photodegradation of Poly (Vinyl Chloride), Polymer Degradation and Stability, 2000, pp. 185-196, vol. 68.

Masahisa Ogawa, Development of Silica-Coated Titanium Dioxide, Fragrance Journal, 1998, pp. 28-32, vol. 26.

(Continued)

*Primary Examiner*—Randy Gulakowski
*Assistant Examiner*—M. Bernshteyn

(57) ABSTRACT

Coated titanium dioxide pigment having high UV absorption properties and use in polymer compositions, especially PVC for building and residential construction is described.

2 Claims, No Drawings

FOREIGN PATENT DOCUMENTS

| | | |
|---|---|---|
| JP | 10139434 | 5/1998 |
| JP | 11029680 | 2/1999 |
| JP | 2003025479 | 1/2000 |
| JP | 2000256014 | 9/2000 |
| JP | 2001200107 | 7/2001 |
| JP | 200319128 | 1/2003 |
| JP | 2003327431 | 2/2003 |
| JP | 06025515 | 2/2004 |
| JP | 2004010638 | 7/2004 |
| KR | 200059935 | 10/2000 |
| WO | WO 97/18266 | 5/1997 |
| WO | WO 98/50472 | 11/1998 |
| WO | WO0011070 | 3/2000 |

OTHER PUBLICATIONS

P. Stamatakis et. al., Optimum Particle Size of Titanium Dioxide and Zinc Oxide for Attenuation of Ultraviolet Radiation, J. Coatings Tech., 1990, pp. 95-98, vol. 62.

Anthony L. Andrady et. al., Light Stabilization of Polymers Using Opaque Pigments, Journal of Applied Polymer Science, 1987, pp. 1389-1395, vol. 33.

Titainium Dioxide in Polymers Annu. Tech. Conf., Soc. Plast. Eng., Tech. Pap., 26th (1968), 303-307 Soc. of Plast. Eng., Inc., Greenwich, Conn. Komar, Leonard C.; Butler, J. Russell.

Characterization of metal-ozide nanoparticles: Synthesis and dispersion in polymer coatings Sung, Li-Piin, Scierka, Stephanie; Baghai-Anaraki, Mana; Ho, Derek I. National Institute of Standards and Technology, Gaithersburg, MD; Materials Research Soolet Symposium Proceedings (2002), 740 (Nanomaterials for Structural Application), 147-152.

"UV protection effectiveness of plastic particles coated with titanium dioxide by rotational impact blending" Liang, H; Ueno, A; Shinohara, K. Division of Materials Science and Engineering, Graduate School of Engineering, Hokkaido University, Chemical Engineering Research and Design (2000), 78(A1), 49-54.

Hawley's Condensed Chemical Dictionary, p. 1108 (NY 1987).

MSDS sheet for 93% sulfuric acid sold by Simplot Industrial Products.

MSDS sheet for 95-96% sulfuric acid sold by Fischer Scientific.

Diebold et al. "Rapid Assessment of TiO2 Pigment Durability via the Acid Solubility Test". JCT Research, Jul. 2004.

Ambrose, John F. "Pigments In Polymer Materials" British Plastics and Moulded Products Trader (1957), 30, 446-447 Journal.

Bolt et al. "The Role of Titanium Dioxide Pigments in Durability of Exterior PVC", 9th International PVC Brighton Conference: PVC 2005, Brighton, UK, Apr. 26-28, 2005.

Gesenhues et al., "TiO2 Pigment Structure and Kinetics of PVC Weathering", Sachtleben Chemie GmbH, Journal of Vinyl & Additive Technology, Jun. 2000, vol. 6 No. 2, pp. 60-67.

Hawley's Condensed Chemical Dictionary, p. 1108 (NY 1987).

MSDS sheet for 93% sulfuric acid sold by Simplot Industrial Products, Jun. 2001.

MSDS sheet for 95-96% sulfuric acid sold by Fischer Scientific, 2000.

Diebold et al. "Rapid Assessment of TiO2 Pigment Durability via the Acid Solubility Test", JCT Research, Jul. 2004.

Ambrose, John F. "Pigments in Polymer Materials" British Plastics and Moulded Products Trader (1957), 30, 446-447 Journal.

Bolt et al. "The Role of Titanium Dioxide Pigments in Durability of Exterior PCV", 9th International PVC Brighton Conference; PVC 2005, Brighton, UK, Apr. 26-28, 2006.

Gesenhues et al., "TiO2 Pigment Structure and Kinetics of PVC Weathering", Sachlleben Chimie GmbH, Journal of Vinyl & Additive Technology. Jun. 2000, vol. 8, No. 2, pp. 80-87.

\* cited by examiner

TITANIUM DIOXIDE PIGMENT AND POLYMER COMPOSITIONS

BACKGROUND OF THE INVENTION

1. Field of the Invention

The present invention relates to a coated titanium dioxide pigment with high ultraviolet (UV) absorption properties. This invention further relates to polymer compositions, especially polyvinyl chloride (PVC), incorporating coated titanium dioxide pigments with high UV absorption properties.

2. Description of the Related Art

Titanium dioxide ($TiO_2$) is inherently photoactive, acting as a photocatalyst initiating chemical reactions which break down polymer resins. This type of degradation on the surface of a resin is evident in chalking and loss of surface gloss. Therefore, for many applications, titanium dioxide is surface-treated by coating/encapsulating the $TiO_2$ particles to reduce photoactivity, that is, to make the particles "durable". Surface treatments to encapsulate $TiO_2$ particles include providing the particles with coatings of metal oxides, such as, silica, alumina, zirconia and the like, to suppress the photochemical activity. Such pigments are generally prepared by providing $TiO_2$ pigment particles with a dense metal oxide coating. These pigments are used mainly in exterior applications or in uses that require some resistance to elements such as sunlight, temperature, humidity, etc. While dense metal oxide coatings enhance the durability of $TiO_2$ pigment particles, there is still a need to limit the amount of UV light absorbed by the polymer.

U.S. Pat. Nos. 2,885,366 and 3,437,502 (also Re. 27,818) provide the basic teachings for making a durable titanium dioxide pigment having an amorphous silica coating followed by a coating of hydrous alumina. These patents are directed at providing durable $TiO_2$ pigments for use in making paints.

There is further need for a $TiO_2$ white pigment with improved UV absorption. UV absorption by $TiO_2$ pigment protects polymer resins from direct UV degradation and discoloration. The higher the UV absorption of the $TiO_2$ pigment, the greater the UV protection.

Titanium dioxide particles of small particle size, including "nano"-$TiO_2$, are known to provide UV absorption when incorporated into polymer systems. However, due to their size, they can be beneficial for transparency but less beneficial for whiteness or opacity. In addition, small particles have large total surface area and require proportionately larger amounts of metal oxide surface treatment to suppress photocatalytic degradation inherent in $TiO_2$.

Palmer, et al., in U.S. Pat. No. 5,352,725, disclose use of ultraviolet scattering and absorbing metal oxide particles, such as titanium dioxide and zinc oxide in polymer resins for the purpose of minimizing ultraviolet degradation of the resin and its underlying substrate. Palmer, et al., disclose use of particles in a size range of 0.001 micron to 0.20 micron, preferably, 0.01 micron to 0.15 micron, but are silent on how particle size is measured, and whether primary or agglomerates are being measured. Palmer teaches use of particles with low opacity to attenuate UV degradation in a surface layer to protect underlying polymer substrate from UV absorption.

Titanium dioxide of the prior art provides either good UV protection with transparency or low opacity, or it provides lower UV protection with good opacity. A titanium dioxide pigment combining both improved UV protection and good opacity is therefore desirable.

Polymer compositions tend to discolor, turning yellow, when exposed to UV light present in sunlight. The yellow coloring is unattractive and highly disfavored. Such compositions containing titanium dioxide pigments are widely used in building and residential construction materials, such as vinyl siding, door and window profiles, outdoor furniture and fencing. It is therefore, further desired to provide a polymer composition with improved UV stability.

The present invention meets these needs.

SUMMARY OF THE INVENTION

The present invention provides a coated titanium dioxide white pigment comprising 1.2 to 10 wt % silica, preferably 2 to 6 wt %, and 0 to 10 wt % alumina, preferably 0.5 to 5 wt %, based on total weight of the coated pigment, having a UV absorption at 340 nm of at least 0.40, a vinyl undertone of at least 0.023, a vinyl tint strength of at least 80, and an acid solubility of no greater than 12. Preferably, the coated titanium dioxide pigment has a UV absorption at 340 nm of from 0.42 to 0.7 and a vinyl undertone of from about 0.025 to about 0.130, more preferably, UV absorption at 340 nm of from 0.42 to 0.65 and a vinyl undertone of from about 0.028 to about 0.100. Preferably the titanium dioxide pigment has a vinyl tint strength of at least 90, more preferably at least 95. Preferably, the coated titanium dioxide pigment has an acid solubility of no greater than 10, more preferably, no greater than 8.

The coated titanium dioxide pigments of this invention have improved properties, especially when used in polymer resins.

In another aspect of the invention, there is provided a polymer composition comprising a polymer and a coated titanium dioxide white pigment comprising 1.2 to 10 wt % silica, preferably 2 to 6 wt %, and 0 to 10 wt %, preferably 0.5 to 5 wt %, based on total weight of the coated pigment, having a UV absorption at 340 nm of at least 0.40, a vinyl undertone of at least 0.023, a vinyl tint strength of at least 80, and an acid solubility of no greater than 12.

A polymer composition with superior resistance to yellowing is provided by incorporating a coated titanium dioxide pigment with both good UV absorption and opacity/whiteness into a polymer composition. Not only is yellowing of the polymer reduced or delayed, but even when yellowing does occur, the polymer composition is slow to appear discolored due to the opacity/whiteness provided by the $TiO_2$ pigment.

Vinyl undertone values are influenced by the primary particle sizes as well as the size of the agglomerates. While the primary particle size is the dominant factor the size of the agglomerates can have an impact on vinyl undertone.

DETAILED DESCRIPTION OF THE INVENTION

In accordance with this invention, coated titanium dioxide pigment is provided with combined properties of durability, UV absorption and opacity. The pigment of this invention may be incorporated into polymers to reduce yellowing or loss of mechanical properties and other degradation of the polymer caused by UV light absorbed by the polymer. Loss of mechanical properties can be shown by cracking or structural weakness of the finished polymer product. The invention relates to the discovery of a direct relationship between the vinyl undertone value of titanium dioxide pigments and their ability to absorb UV light; that is, a high vinyl undertone value relates to a high UV absorbtion capability. This lead to the discovery of a coated titanium dioxide pigment having a high opacity, high vinyl tint strength and low acid solubility which is beneficial for polymers used in exterior applications.

TiO$_2$ Pigment

Titanium dioxide (TiO$_2$) pigment useful in the present invention may be in the rutile or anatase crystalline form. Rutile is preferred due to its higher tint strength. It is commonly made by either a chloride process or a sulfate process. In the chloride process, TiCl$_4$ is oxidized to TiO$_2$ particles. In the sulfate process, sulfuric acid and ore containing titanium are dissolved, and the resulting solution goes through a series of steps to yield TiO$_2$. Both the sulfate and chloride processes are described in greater detail in "The Pigment Handbook", Vol. 1, 2nd Ed., John Wiley & Sons, NY (1988), the teachings of which are incorporated herein by reference. Preferably, the TiO$_2$ pigment is rutile made using the chloride process.

By "pigment" it is meant that the titanium dioxide particles have a median size of less than 1 micron, based on light scattering measurements. Preferably, the particles have a median size of from 0.18 to 0.50 microns, more preferably, 0.20 to 0.40 microns and most preferably 0.25 to 0.35 microns.

The titanium dioxide pigment may be substantially pure titanium dioxide or may contain other metal oxides, such as silica, alumina, zirconia. Other metal oxides may become incorporated into the pigment particles for example, by co-oxidizing or co-precipitating titanium compounds with other metal compounds, such as metal halides of silicon, aluminum and zirconium. If co-oxidized or co-precipitated metals are present, they are preferably present in an amount 0.1 to 5 wt % as the metal oxide based on the weight of the titanium dioxide pigment.

When alumina is incorporated into the pigment particles by co-oxidation of aluminum halide, especially aluminum chloride, alumina is preferably present in an amount 0.5 to 5 wt %, and more preferably 0.5 to 1.5 wt % based on the total pigment weight. Typically, alumina from co-oxidation is present in the titanium dioxide pigment when prepared by the chloride process.

Silicon halides, such as silicon tetrachloride, SiCl$_4$, may be optionally co-oxidized with the TiCl$_4$, in accordance with the teachings of Gonzales, U.S. Pat. No. 5,562,764, incorporated herein by reference. If the process to produce the TiO$_2$ pigment of this invention includes co-oxidation of silicon halide according to U.S. Pat. No. 5,562,764, silica from co-oxidation is typically present in an amount 0.5 to 5 wt %, and preferably 0.5 to 3 wt % based on the total pigment weight.

To achieve durability, the titanium dioxide pigment is coated with silica and optionally, alumina. These coatings may be applied using surface wet treatment techniques known by those skilled in the art. Alternatively, surface coatings of silica may be achieved by oxidation of TiCl$_4$ with SiCl$_4$, as disclosed by Subramanian, et al., in U.S. patent application US-2003-0051635-A1, incorporated herein by reference. Such coatings are sufficient to achieve acid solubility of no greater than 12. Other metal oxide coatings such as zirconia may also be present.

The coated titanium dioxide pigment of this invention comprises a silica coating in an amount of about 1.2 to about 10 wt % silica, based on the total weight of the coated pigment. Preferably, the pigment comprises 2 to 6 wt % silica, when the coating is provided by surface wet treatment techniques, more preferably, 3 to 4 wt % silica. Preferably, the pigment comprises 1.2 to 6 wt % silica, when the coating is provided from co-oxidation of silicon tetrachloride, more preferably, 1.5 to 4 wt %.

The coated titanium dioxide pigment of this invention can comprise an alumina coating. The amount of alumina of the coating can be up to and including 10 wt. %, typically ranging from about 0 to about 10 wt % alumina, based on the total weight of the coated pigment. Preferably, the titanium dioxide pigment of this invention comprises an alumina coating in an amount of about 0.5 to about 5 wt % alumina, more preferably about 2 to about 3 wt %.

A particularly preferred coated titanium dioxide pigment comprises a silica coating of 3 to 4 wt % silica, provided by surface wet treatment techniques and an alumina top coating of 2 to 3 wt % alumina, based on the total weight of the coated pigment. The actual content of silica and alumina in this preferred coated titanium dioxide pigment may be greater than the content of the surface coatings due to the presence of co-oxidized silica and/or alumina.

The coated titanium dioxide pigment of this invention has a UV absorption at 340 nm of at least 0.40, preferably from 0.42 to 0.7 and more preferably 0.42 to 0.65. For purposes of this invention, UV absorption at 340 nm means UV absorption measured using 25 ppm suspension and a 1 cm cell path as described in the test method of the Examples set forth below. UV absorption is a measurement of pigment ability to protect polymer resins from direct UV degradation and discoloration. The higher the UV absorption of the TiO$_2$ pigment, the greater the UV protection.

The coated titanium dioxide pigment of this invention has a vinyl undertone of at least 0.023, preferably from 0.025 to 0.130, and more preferably from 0.028 to 0.100. Vinyl undertone is a measurement of the relative scattering of blue and red visible light. A higher or more positive vinyl undertone indicates the TiO$_2$ scatters blue light more strongly relative to red light scattering compared to a TiO$_2$ with a lower, less positive undertone. Vinyl undertone of TiO$_2$ affects the color of resins pigmented with both white pigment (TiO$_2$) and colored pigments.

The coated titanium dioxide pigment of this invention has a vinyl tint strength of at least 80, preferably at least 90, and more preferably, at least 95. Vinyl tint strength is a measure of opacity, the ability of a white pigment to provide whiteness and brightness.

The coated titanium dioxide pigment of this invention has an acid solubility of no greater than 12, preferably no greater than 10 and more preferably, no greater than 8. Acid solubility is a measurement of pigment encapsulation by silica which is directly related to providing durability.

The combination of surface coating and control of undertone and UV absorption properties provides a coated titanium dioxide white pigment with good opacity, good durability and improved UV absorption relative to currently available TiO$_2$ pigments.

Process

Preferably the TiO$_2$ used in the present invention has been prepared by the chloride process. Such process has been described for example in U.S. Pat. Nos. 2,488,439, 2,488,440, 2,559,638, and 3,208,866, the teachings of which are incorporated herein by reference. In this process, base TiO$_2$ can be produced by oxidizing TiCl$_4$ in the vapor phase at from about 900° C. to 1600° C. with an oxygen-containing gas, preferably in the presence of an aluminum halide co-oxidant and a vaporized alkali metal salt which acts as a nucleant.

The hot gaseous suspension of $TiO_2$ solids and free chlorine must be quickly cooled below 600° C. within about 1-60 seconds following discharge of the suspension from a reactor. This cooling can be accomplished in an externally cooled conduit in which good heat transfer can be maintained by minimizing the adherent layers by adding scouring particles or scrubs so that undesired $TiO_2$ particle size growth is prevented and particle agglomeration is minimized. The pigment can be recovered by conventional methods and subjected to grinding operations such as milling, etc.

The pigment base will typically have a carbon black undertone, CBU, of at least 16, preferably, at least 17. Typically, a CBU of at least 16 is needed for the vinyl undertone of the coated titanium dioxide pigment to have a value of 0.023 but other factors can influence vinyl undertone including, without limit, silica, alumina and grinding. To prepare such a pigment base, a number of modifications to the oxidation process can be made. The oxidation step can be performed in the presence of a silicon halide as described in U.S. Pat. No. 5,562,764 and/or U.S. Patent Application No. US-2003-0051635-A1, which may be added downstream from the $TiCl_4$ stream. Preferably, a vaporized metal salt is added, which acts as a nucleant. More preferably, the vaporized alkali metal salt is a cesium salt, as described in U.S. Pat. No. 5,201,949, the teachings of which are incorporated herein by reference. Optionally, the cooling conduit is a finned flue as described in U.S. Pat. No. 4,937,064, with expansion section as described in U.S. Pat. No. 5,538,708, the teachings of which are incorporated herein by reference.

The pigment can be recovered by conventional methods and is then subjected to grinding in a fluid energy mill and subsequently can also undergo other milling operations such as media milling, etc. to obtain a $TiO_2$ pigment base having a high CBU.

The $TiO_2$ pigment of this invention may be prepared from the $TiO_2$ pigment base by surface wet treatment. This process comprises preparing an aqueous slurry of $TiO_2$ pigment base. This slurry is heated to about 65° C. to 95° C. and held at that temperature throughout the remainder of the preparation procedure. The slurry is adjusted to a pH of 8-12, preferably about pH 10, by the addition of a sufficient quantity of base, especially an aqueous caustic solution. An aqueous solution of a silica source, especially sodium silicate, is then added to the $TiO_2$ slurry. The slurry is then neutralized by addition of an acid, such as hydrochloric acid. As acid is added, $SiO_2$ will be deposited and densified on the surfaces of the $TiO_2$ particles. The pigment is then cured at 65° C. to 95° C. for about 15-30 minutes.

To effect an alumina topcoat on the silica-coated $TiO_2$ particles, a sufficient amount of a metal aluminate, preferably sodium aluminate, is added to the $TiO_2$ slurry at a temperature of 65° C. to 95° C. after the silica coating has cured. Acid, normally hydrochloric or sulfuric, is added to maintain the pH of the slurry within the range of 5-9 as to effect deposition of an alumina coating.

The resulting pigment is then separated from the liquid by filtration or centrifugation. The pigment is washed with water until free from salts.

Alternatively, the pigment is surface coated in the oxidation reactor with silica as described in U.S. Patent Application No. US-2003-0051635-A1. If so, subsequent surface wet treatment to provide a silica coating is optional. Providing an alumina top coating is also optional.

The pigment product is dried and then subjected to grinding to break up agglomerates to achieve the desired agglomerate particle size. Grinding may be accomplished by using a fluid energy mill, preferably in the presence of a processing aid. Processing aids can be organic or inorganic, as described in U.S. Pat. No. 3,549,091, the teachings of which are incorporated herein by reference. Preferred processing aids include triethanol amine (TEA), 2-amino-2-methyl-1-propanol (AMP), trimethylol propane (TMP), trimethylol ethane (TME), octyl triethoxysilane (OTES), polydimethylsiloxane (PDMS), hexamethyldisilazane (HMDS), tetrapotassium pyrophosphate (TKPP) or the like and mixtures thereof. Organic processing aids are particularly preferred, especially, TMP and TME.

Polymer Composition

Polymer compositions of this invention incorporate the coated titanium dioxide pigment of this invention, which protects the polymer compositions from discoloring when exposed to UV light.

In general, polymers suitable for use in the polymer composition of this invention include plastic and elastomeric polymers.

Polymers which are suitable for use in the polymer composition of this invention include, by way of example but not limited thereto, polymers of ethylenically unsaturated monomers, vinyl polymers, phenolics, alkyds, amino resins, epoxy resins, polyamides, polyurethanes; phenoxy resins, polysulfones; polycarbonates; acrylonitrile-butadiene-styrene (ABS) copolymers and ABS-polycarbonate blends; polyesters and chlorinated polyesters; polyethers; acetal resins; polyimides; polyoxyethylenes; and mixtures of these. Polymers of ethylenically unsaturated monomers include polyolefins such as polyethylene, polypropylene, polybutylene, copolymers of ethylene with higher olefins such as alpha olefins containing 4 to 10 carbon atoms, and copolymers of ethylene with vinyl acetate. Vinyl polymers include polyvinyl chloride, polyvinyl esters such as polyvinyl acetate, polystyrene, acrylic homopolymers and copolymers.

Polymers suitable for use in the present invention also include various rubbers and/or elastomers, either natural or synthetic polymers based on copolymerization, grafting, or physical blending of various diene monomers with the above-mentioned polymers, all as generally known in the art.

Preferably, the polymer is selected from the group consisting of polyolefin, polyvinyl chloride, polyamide, polyester, acrylonitrile-butadiene-styrene (ABS) copolymers and ABS-polycarbonate blends, and mixture of these.

The amount of $TiO_2$ pigment used in the polymer composition of this invention can be an additive amount. Typically an amount sufficient to impart UV protection and opacity to the polymer composition is used. Typically the amount ranges from about 0.5 to about 15 parts by weight of pigment per 100 parts of polymer, preferably about 2 to 8 parts by weight of pigment per 100 parts of polymer. As those skilled in the art will appreciate, the amount of pigment may vary, depending on the type of polymer and its use.

The polymer composition of this invention is particularly useful in the construction industry such as in the renovation of buildings and homes. For example, the polymer composition of this invention is useful in extruded parts, such as, polyvinyl chloride (PVC) or "vinyl" siding, door and window profiles, as well as in roofing materials and other building materials, films and sheets used for outdoor signs, outdoor furniture, and fencing, decking and railings. Manufacturing methods are known in the industry. Each of these applications will benefit from the greater UV absorption and the resistance to chalking and loss of gloss provided by the $TiO_2$ pigment of this invention when incorporated into PVC formulations. In addition to extruded PVC applications, the $TiO_2$ pigment of this invention is useful in injection molded, blow-molded, calendered and thermoformed PVC products wherever they are exposed to UV light, such as in outdoor applications. In addition, other polymer resins will benefit from incorporation of these $TiO_2$ pigments with improved UV absorption.

Preparation of the Polymer Composition

The present invention provides a process for preparing a polymer composition. Any compounding techniques, known to those skilled in the art may be used. Generally, the pigment, polymer and any additives are brought together and then mixed in a blending operation, such as dry blending. Methods for dry blending include shaking in a bag or tumbling in a closed container. Other methods include blending using agitators or paddles. Pigment, polymer and additives, may be co-fed using screw devices, which mix the pigment, polymer and additives together before the polymer reaches a molten state.

After mixing or blending, the pigmented polymer is melt blended, using any methods known in the art, including screw feeders, kneaders, high shear mixers, blending mixers, and the like. Typical methods use Banbury mixers, single and twin screw extruders, and hybrid continuous mixers.

Processing temperatures depend on the polymer and the blending method used and are well known to those skilled in the art. The intensity of mixing depends on the degree of softening.

The pigmented polymer composition produced by the process of this invention is useful in production of shaped articles. A shaped article is typically produced by melt extrusion of the pigmented polymer to form the finished article of manufacture. In this process, single screw and twin screw extruders are commonly used. Co-rotating twin screw extruders are available from Werner and Pfleiderer. The melt blended polymer is extruded to form a shaped article.

Other Additives

A wide variety of additives may be present in the polymer composition produced by the process of this invention as necessary, desirable or conventional. Such additives include catalysts, initiators, anti-oxidants (e.g., hindered phenol such as butylated hydroxytoluene), blowing agent, ultraviolet light stabilizers (e.g., hindered amine light stabilizers or "HALS"), organic pigments including tinctorial pigments, plasticizers, antiblocking agents (e.g. clay, talc, calcium carbonate, silica, silicone oil, and the like) leveling agents, flame retardants, anti-cratering additives, and the like.

The present invention provides a flexible polyvinyl chloride composition comprising polyvinyl chloride, a titanium dioxide and plasticizer.

The present invention further provides a rigid polyvinyl chloride (PVC) for use in exterior applications comprising heat stabilizers (to retard discoloration due to heat during the melt processing), lubricant and/or wax, pigment (the $TiO_2$ of this invention and additional colored pigments), fillers (such as $CaCO_3$), and impact modifiers (may be part of the PVC polymer or separate).

In one embodiment, the invention herein can be construed as excluding any element or process step that does not materially affect the basic and novel characteristics of the composition or process. Additionally, the invention can be construed as excluding any element or process step not specified herein.

The following Examples are construed as illustrative and not limitative of the remainder of the disclosure in any way whatsoever.

EXAMPLES

Test Methods

Carbon Black Undertone (CBU)

Carbon Black Undertone (CBU) is a measure of primary particle size that depends to a certain extent on the amount of particles present as agglomerates. CBU is determined by mulling together a suitable liquid, such as light colored oil and standard weights of the sample and a standard carbon black. The mixture is spread on a panel and the relative blueness of the gray mixtures observed. Fine particles give bluer undertone or higher CBU. CBU is described in greater detail in U.S. Pat. No. 2,488,440, the teachings of which incorporated herein by reference except using a reference value of 10 rather than 100 as used therein.

UV Absorption of $TiO_2$ White Pigments

The following is a simple method to measure UV absorption of $TiO_2$ white pigments, measured at 340 nm. $TiO_2$ pigment is dispersed in an aqueous solution of a phosphate dispersant using an ultrasonic disperser, then diluted to about 25 ppm by weight and the UV absorption is measured by the attenuation of transmitted light at 340 nm is a simple single beam spectrophotometer. The solution for dispersing pigment during sonication contains 0.4 g/Kg TKPP (tetra potassium pyrophosphate) in water. The solution for subsequent dilution contains 0.016 g/Kg TKPP.

Two grams of dry $TiO_2$ pigment is weighed to the nearest 0.001 g and transferred to a water-cooled sonication vessel. 80 ml of sonication solution (0.4 g/Kg TKPP) is added and the suspension is sonicated for 2 minutes at full power using a Dukane Model 20P500 ultrasonic disperser equipped with a 0.5 inch sonic horn tip, preferably mounted in a sound proof box. (Equivalent dispersers may also be used, such as a Heat Systems Model XL2020 with a 2× booster.) The $TiO_2$ suspension is recovered quantitatively and diluted with 0.4 g/Kg TKPP solution to a total weight of 200 g recorded to the nearest 0.01 g, as are subsequent dilutions by weight. 12 grams of this suspension is diluted to 240 g with 0.016 g/Kg of TKPP in water. This dilute suspension is further diluted, 12 grams to 240 gram of the dilution solution, giving a final $TiO_2$ concentration of approximately 25 ppm. The precise concentration is calculated and the subsequent UV absorption is normalized to 25 ppm for comparative purposes. The UV absorption at 340 nm, defined as:

$$A = -\log_{10}(I/I_o)$$

where $I/I_o$ is the fraction of light transmitted through a 1 cm path is measured in a single beam spectrophotometer. Light scattering of rutile $TiO_2$ pigments at this wavelength is very low compared to absorption. Absorption, A, is equivalent to OD (optical density).

For pigments that contain an organic surface treatment that renders them hydrophobic, the sonication solution is modified by inclusion of 0.58% sodium dioctyl sulfosuccinate. This surfactant may be obtained from commercial sources such as Aerosol® OT-70-PG, a 70% solution in propylene glycol and water. The $TiO_2$ is premixed with the TKPP-surfactant solution and sonicated for twice as long. The dilution solution contains 0.016 g TKPP and 0.023% surfactant.

Acid Solubility Test 10 mL 66 degrees Baumé concentrated (93, 98, 99 or 100%) sulfuric acid is added to a test tube containing a magnetic stirring bar, and the tube is placed in an aluminum heating block and heated to 175° C. A 0.2000 g pigment sample is added to the tube, and digested for 1 hour with stirring. At the conclusion of the digestion period, the tube containing the pigment sample is cooled by pouring the acid mixture into a beaker of ice, and the residue in the tube and beaker is washed with distilled water. The pigment residue in the tube and beaker is collected in a 100 mL volumetric flask, the volume made up to 100 mL by addition of distilled water, and the contents mixed thoroughly. The contents of the volumetric flask are then filtered, and 10 mL of the resulting filtrate are added to a 25 mL volumetric flask, to which 2 mL 20% hydrogen peroxide, and sufficient 10% sulfuric acid to make 25 mL, are added. The resulting solution is allowed to stand one hour. Absorbance of the solution is then read at 400 nm using a 10 mm cell path. Soluble $TiO_2$ is determined by reference to a previously prepared spectrophotometric curve obtained by measurement of samples containing known quantities of dissolved $TiO_2$.

Surface Area

Surface area was determined by $N_2$ adsorption using the BET method. When used to compare $TiO_2$ oxidation bases which have no surface treatment added after the oxidation process (no hydrous silica or alumina) it is a good measurement of primary particle size. The equivalent spherical particle diameter may be calculated from the density (approximately 4 $g/cm^2$ for most rutile $TiO_2$ pigments):

Diameter=6/(density×surface area)

Horiba Light Scattering Particle Size

Particle size in microns is determined by a Horiba LA-900 laser light scattering particle size analyzer (from Horiba Instruments, Inc., Irvine, Calif.). The $TiO_2$ pigment, prior to dispersion in the tank, was prepared as approximately a 3% solids slurry in 0.4 g/L TKPP solution. This mixture was sonicated for 10 minutes on a 7 power setting using a Sonicator Ultrasonic Liquid Processor Model XL 2020 (available from Heat Systems, Inc., Farmingdale, N.Y.) and then the particle size of the $TiO_2$ pigment was measured using the Horiba instrument described above. The slurry product was taken directly and mixed with water to a point the LA-900 would operate, as recommended by the manufacturer and then the particle size was measured using the Horiba instrument described above. Average (mass median) particle size is reported as $D_{50}$.

Vinyl Tint Strength (VTS) and Vinyl Undertone (VUT)

Tint strength (VTS) was used as a measure of opacity of the pigments. VTS, a measure of the ability of a white pigment to provide whiteness and brightness, is determined by reflectance readings of gray tinted vinyl sheets using a spectrophotometer. The higher the reflectance, the higher is the vinyl tint strength.

These optical properties of the $TiO_2$ pigment were evaluated by dispersing $TiO_2$ in black vinyl compound on a two-roll mill. The tristimulus values, X, Y, Z, of the vinyl sheet were measured with a Hunterlab Labscan spectrocolorimeter, and VTS and VUT were calculated versus standards prepared at the same time. VTS and VUT were derived from Y, and Z/X respectively. L*, a*, and b*, the color space coordinates defined by CIE (Commission Internationale de l'Edairage) in 1976, can also be read directly on the spectrocolorimeter.

To determine VTS and VUT: 5.00+/-0.01 g of $TiO_2$ pigment is dispersed in 153+/-0.5 g of a premixed plasticized PVC masterbatch and dispersed on a two-roll mill at 300 degrees F. The two-roll mill runs at 45 and 35 feet per minute on the front and rear rolls, respectively. The roll clearance is adjusted to from 0.022 inch to 0.025 inch (+/-0.001 inch) from one end of the roll to the other. A suitable PVC masterbatch contains 100 parts by weight of PVC resin (such as OXT-230 PVC resin from Occidental Chemical corp., Pottsdown, Pa.), 0.25 parts stearic acid, 44.8 parts dioctylphthalate (or an equivalent plasticizer such as diisononylphthalate), 5 parts epoxidized soybean oil, 3 parts stabilizer (such as Interstab LT4785 from Akcros Chemical Co., New Brunswick, N.J.), and 0.153 parts of a suspension of carbon black 20% by weight in the dioctylphthalate plasticizer. The PVC masterbatch is added to the roll mill and banded for two minutes. Then the $TiO_2$ pigment sample is added slowly and evenly across the roll nip region to incorporate it into the PVC. The PVC is cut and re-banded at least 5 times in 2 to 3 minutes. The PVC is removed from the rolls, cooled slightly and re-banded onto the roll mill for an additional 15 cuts over about 4 minutes. The PVC sheet is removed, cooled and the X, Y, Z tristimulus values (red, green, and blue) are measured. The ratio Z/X is used to determine the VUT value with either a single standard or a series of standards using a calibration plot. For the single standard method:

VUT=Z/X$_{(sample)}$−Z/X$_{(standard)}$+VUT$_{(standard)}$

The Y value is used to calculate the VTS of the $TiO_2$ pigment. It represents $R_\infty$ in the Kubelka-Munk analysis as defined by J. V. Robinson (Tappi, October 1975, Vol. 58, page 152-153). The ratio of the light absorption coefficient to the light scattering coefficient of the PVC sheet is K/S. When Y is expressed as a fraction (between 0 and 1):

K/S=(1−Y)$^2$/(2Y)

Y values should range between 30% and 45%. VTS is determined by using either a single standard or a series of standards using a calibration plot. With a single standard:

$$VTS = \frac{K/S_{(standard)} \times VTS_{(standard)}}{K/S_{(sample)}}$$

Commercial pigment products, such as the comparison pigments shown in Table 1, are suitable standards when measured and found to be representative of the average values of these commercial products.

Color

Color of the $TiO_2$ white pigments is measured using diffuse reflectance and the L*a*b* scale in CIE color space. L*, a*, and b* are the color space coordinates defined by CIE (Commission International de Eclairage which is sometimes referred to as the International Commission on Illumination) in 1976. The color of the $TiO_2$ pigment is measured on a pressed pellet of the dry pigment.

Example 1

Two tons (dry weight) of $TiO_2$ rutile oxidation base made by the chloride process (by oxidation of $TiCl_4$) was collected as a slurry in water. The carbon black undertone (CBU) of the oxidation base was 16.7 and the $Al_2O_3$ content was 1.2% provided by co-oxidation of $AlCl_3$. The oxidation base $TiO_2$ was surface treated as follows: Steam was added to heat the slurry to 90° C.; at that point the suspended $TiO_2$ concentration was 298 grams per liter. The pH was adjusted to between 10.3 and 10.7. 38 gallons of sodium silicate was added. After stirring for 5 minutes, the silicate was slowly neutralized by adding 26.5 gallons of HCl (approximately 20% HCl) over a period of 60 minutes. The pH was approximately 6. Steam addition was continued sufficient to maintain the temperature at 90° C. during stirring for an additional 40 minutes. Then 17.7 gallons of sodium aluminate and 23.3 gallons of HCl were simultaneously added. The pH was approximately 7. After stirring for an additional 15 minutes the pH was adjusted to between 5 and 5.5. The surface treated $TiO_2$ was filtered to remove dissolved salts and the filter cake was pumped to a spray dryer and dried. The dry pigment was conveyed to a fluid energy mill feed bin. Several additional batches of oxidation base $TiO_2$ were surface treated in the same way and combined in the fluid energy mill feed bin. The surface treated $TiO_2$ was then ground in a fluid energy mill with steam, at a steam to pigment ratio of 3.4 while adding TMP (trimethylolpropane) at the feed chute of the fluid energy mill at a weight ratio of approximately 0.35% TMP to the $TiO_2$.

The $TiO_2$ pigment product obtained after the grinding step had the composition and properties shown in the table below.

Example 2

Two tons (dry weight) of chloride process rutile oxidation base were collected as a slurry in water and heated to 90° C. with steam. The $TiO_2$ concentration was adjusted to 276 gram per liter. The oxidation base had a carbon black undertone of 17.2 and contained 1.2% $Al_2O_3$ from cooxidation of $AlCl_3$. Four oxidation base samples collected during the production period had an average CBU of 17.2, with an average surface area of 8.34 $m^2/g$. The two tons of oxidation base pigment was surface treated with silica by adjusting the pH to approximately 10.3, adding 47.9 gallons of sodium silicate followed by 28 gallons of ~20% HCl added over a period of 75 minutes thereby lowering the pH to about 6. After stirring for 40 minutes at 90° C., 22 gallons of sodium aluminate and 30 gallons of HCl were added simultaneously. After stirring and then adjusting the pH to approximately 5, the surface treated $TiO_2$ pigment was filtered and dried. After combining several batches treated in the same way, the pigment was ground in a steam fluid energy mill at a steam-to-pigment ratio of 2.9.

The ground $TiO_2$ pigment had the composition and properties shown in the table below.

Example 3

A chloride process oxidation base with a CBU of 20.1 was collected as a slurry in water. A portion was filtered, washed and dried for measurement of the CBU and the surface area, which was 13.4 $m^2/g$. 25 liters of the oxidation base slurry containing 5100 grams of $TiO_2$ was heated to 900° C. by steam addition and adjusted to pH 10.2 by the addition of sodium hydroxide, 985 grams of sodium silicate (29% $SiO_2$) was added to the slurry, then 20% HCl was added slowly so that after 100 minutes 568 ml of HCl had been added and the pH was lowered to 5.5. After stirring for 45 minutes, 490 grams of sodium aluminate was added simultaneously with 20% HCl while maintaining the pH at about 7. After 10 minutes at pH 7, the pH was lowered to 6.0 and the slurry was filtered and washed with water. The dry product was pulverized and then ground in a lab-scale fluid energy mill. The final $TiO_2$ properties are listed in the table below.

TABLE 1

|  | Examples | | | Average values for comparison | | |
| --- | --- | --- | --- | --- | --- | --- |
|  | | | | Ti-Pure ™ | Ti-Pure ™ | Ti-Pure ™ |
|  | 1 | 2 | 3 | R-960 | R-706 | R-102 |
| $SiO_2$, % | 3.3 | 3.97 | 4.49 | 5.63 | 3.07 | 0.07 |
| $Al_2O_3$, % | 2.7 | 2.84 | 3.39 | 3.31 | 2.42 | 3.89 |
| Carbon, % | 0.19 | 0.2 | — | — | 0.2 | 0.2 |
| Acid Solubility, % | 10 | 5.0 | 5.4 | 2.6 | 5.6 | >20 |
| VTS | 108 | 104 | 100 | 89 | 107 | 110 |
| VUT | +0.030 | +0.027 | +0.069 | −0.029 | −0.005 | +0.032 |
| UV absorption at 340 nm, 1 cm path, 25 ppm | 0.428 | 0.408 | 0.515 | 0.281 | 0.358 | 0.466 |
| CBU | 16.6 | 17.3 | 20.5 | 10.3 | 13.3 | approx. 17.7 |
| Surface Area, $m^2/g$ | 12.6 | 14.5 | 18.9 | 14.1 | 12.0 | 15.8 |
| Median Particle Size (microns) | 0.293 | 0.330 | 0.279 | 0.49 | 0.36 | 0.277 |

Example 4

This example discloses an alternate method of coating the $TiO_2$ particles with silica. Gaseous titanium tetrachloride was mixed with aluminum chloride and the mixture fed to an oxidation reactor. The amount of aluminum trichloride in the mixture was sufficient to provide about 1.2 wt. % aluminum oxide based on total solids formed in the oxidation reactor. The chloride mixture was pre-heated to about 450° C. and introduced into the reaction zone of the reactor at a rate equivalent to about 10 tons per hour of $TiO_2$ produced. Simultaneous with the introduction of the chloride mixture, pre-heated oxygen was continually introduced through a separate inlet. Trace amounts of CsCl dissolved in water was added to the oxygen stream as disclosed in U.S. Pat. No. 5,201,949.

Reaction temperature where the chloride mix contacted the oxygen was about 1550° C. The total excess oxygen was about 16 mole %. Silicon tetrachloride was added as a dispersed liquid at a rate of about 2.5 gallons per minute down stream from where the chlorides and the oxygen streams were initially contacted at the point where less than 1% of the titanium tetrachloride remained unconverted. That is, more than 99% of the titanium tetrachloride had been converted to titanium dioxide. The silicon tetrachloride was introduced along with a carrier gas stream of nitrogen at a rate of about 120 SCF (standard cubic foot) per minute. The silicon tetrachloride was added in an amount sufficient to yield a pigment having 3.3% of its total weight as silicon dioxide. The temperature at this point of addition was estimated to be approximately 950° C.

There was essentially no unreacted silicon tetrachloride in the product exiting the reactor. The $SiO_2$ formed in the reactor sufficiently coated the $TiO_2$ particles to provide low acid solubility in the reactor product and in the product after further processing.

After separation of the chlorine rich gas from the $TiO_2$ solids, the $TiO_2$ pigment produced was collected as a slurry in water. CBU was 17.3. This was neutralized to pH about 8.5 and then filtered to recover the product, which was washed with water and dried. The pigment was ground in a steam fluid energy mill. TMP (trimethylolpropane) was introduced at the feed jet of the fluid energy mill at roughly 0.35% by weight based on the total pigment weight.

The recovered product had the following average properties:

| | |
|---|---|
| VTS | 113 |
| VUT | +0.027 |
| Acid Solubility | 7.0% |
| $SiO_2$ | 3.37% |
| $Al_2O_3$ | 1.2% |
| UV Absorption at 340 nm | 0.434 |
| % carbon | 0.18% (from TMP) |
| Surface Area | 8.6 $m^2/g$ |
| $D_{50}$ by Horiba | 0.296 microns |
| $L^*$ | 99.4 |

Example 5

Polyvinyl chloride (PVC) is compounded with the $TiO_2$ product of Example 1 by methods known in the industry and melt extruded as a white window profile. The compounded PVC and extruded window profile contain 8 phr of $TiO_2$ pigment (phr=pounds per hundred pounds of resin) in a PVC resin containing tin mercaptide heat stabilizer. A similar PVC compound is prepared and extruded as a white window profile which contains 4 phr of $TiO_2$ pigment in a PVC resin containing calcium-zinc heat stabilizer.

The description of illustrative and preferred embodiments of the present invention is not intended to limit the scope of the invention. Various modifications, alternative constructions and equivalents may be employed without departing from the true spirit and scope of the appended claims.

What is claimed is:

1. In an improved flexible polyvinyl chloride composition that resists UV light induced yellowing and mechanical degradation, the polyvinyl chloride composition having a coated titanium dioxide white pigment in an amount ranging from about 0.5 to about 15 parts by weight per 100 part of the polyvinyl chloride, wherein the improvement comprises the titanium dioxide base pigment having a carbon black undertone of at least 16, having a coating of 1.2 to 10 wt. % silica and 0.5-5 wt. % alumina, based on the total weight of the coated pigment, and the coated pigment having a UV absorption at 340 nm of at least 0.40, a vinyl undertone of at least 0.023, a vinyl tint strength of at least 80 and an acid solubility of no greater than 12 wt. % based on the total weight of the coated pigment.

2. In an improved rigid polyvinyl chloride composition that resists UV light induced yellowing and mechanical degradation, the polyvinyl chloride composition having a heat stabilizer, a filler, and an impact modifier, a coated titanium dioxide white pigment in an amount ranging from about 0.5 to about 15 parts by weight per 100 parts of the polymer, wherein the improvement comprises the titanium dioxide base pigment having a carbon black undertone of at least 16, having a coating of 1.2 to 10 wt. % silica and 0.5-5 wt. % alumina, based on the total weight of the coated pigment, and the coated pigment having a UV absorption at 340 nm of at least 0.40, a vinyl undertone of at least 0.023, a vinyl tint strength of at least 80 and an acid solubility of no greater than 12 wt. % based on the total weight of the coated pigment.

* * * * *

(12) EX PARTE REEXAMINATION CERTIFICATE (7692nd)
United States Patent
Bolt et al.

(10) Number: US 7,371,275 C1
(45) Certificate Issued: Aug. 17, 2010

(54) TITANIUM DIOXIDE PIGMENT AND POLYMER COMPOSITIONS

(75) Inventors: John Davis Bolt, Mcewen, TN (US); Robert William Johnson, Kennett Square, PA (US)

(73) Assignee: E. I. du Pont de Nemours and Company, Wilmington, DE (US)

Reexamination Request:
No. 90/010,220, Jul. 15, 2008

Reexamination Certificate for:
Patent No.: 7,371,275
Issued: May 13, 2008
Appl. No.: 10/884,776
Filed: Jul. 2, 2004

(51) Int. Cl.
*C08C 1/00* (2006.01)
*B60C 1/00* (2006.01)
*C09C 1/36* (2006.01)
*C08K 3/10* (2006.01)
*C04B 26/06* (2006.01)

(52) U.S. Cl. .......... 106/430; 106/442; 106/446; 524/847; 524/700; 524/497; 524/493; 524/437; 524/435

(58) Field of Classification Search .......... None
See application file for complete search history.

(56) References Cited

U.S. PATENT DOCUMENTS 5,993,533 A 11/1999 Diebold et al.

OTHER PUBLICATIONS

"More Than 30 Years of Realibility in PVC Profile Protection", Kronos 2220, Kronos 2222 Titanium Dioxide, Kronos Catalog, 2001.
Holtzen, Dwight A., et al., "TiO2 Photochemistry and Color Applications", pp. 2374–2378; Antec 2001.
"How To Select A Suitable Ti–Pure® Grade", Titanium Dioxide for Plastics, Ti–Pure® Only by DuPont, 2001.
Stamatakis, p., et al., "Optimum Particle Size of Titanium Dioxide and Zinc Oxide For Attenuation of Ultraviolet Radiation", pp. 95–98; Journal of Coatings Technology, vol. 62, Oct. 1990.
"More Than Additives", Chemson Group Catalog, pp. 1–10 (2007).

*Primary Examiner*—Alan Diamond

(57) ABSTRACT

Coated titanium dioxide pigment having high UV absorption properties and use in polymer compositions, especially PVC for building and residential construction is described.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *